United States Patent Office 3,332,793
Patented July 25, 1967

3,332,793
SALTS OF ACID POLYESTERS OF POLYALCOHOLS WITH ORGANIC BASES, AND PROCESS OF MAKING AND USING SAME
Emil Dreher, Überlingen (Bodensee), Germany, assignor to Byk-Gulden Lomberg Chemische Fabrik G.m.b.H., Constance, Germany, a corporation of Germany
No Drawing. Filed May 22, 1961, Ser. No. 127,764
Claims priority, application Germany, May 24, 1960, B 57,980
27 Claims. (Cl. 106—187)

The present application is a continuation-in-part of copending applications Ser. No. 750,597, filed July 24, 1958, now U.S. Patent No. 2,973,382, and entitled, "Salts of Acid Diesters of Polyglycols With Organic Bases and Process of Making and Using Same," Ser. No. 802,641, filed Mar. 30, 1959, now U.S. Patent No. 3,075,849, and entitled, "Process of Retarding Sedimentation of Pigments in Film-Forming Coating Materials and Compositions," and Ser. No. 91,613, filed Feb. 27, 1961, and now abandoned, and entitled, "Salts of Acid Diesters of Polyglycols With Organic Bases and Process of Making and Using Same."

The present invention relates to new and valuable suspending agents for pigment-containing lacquers and other film-forming coating materials, to a process of preventing sedimentation and dry-caking of pigments and other finely pulverized fillers in such lacquers and film-forming coating materials, and to a process of preparing such suspending agents.

Paints, enamels, and lacquers, containing pigments as well as other film-forming plastic solutions, emulsions, and dispersions have the disadvantage that the pigments and other filler materials frequently settle on prolonged storage, thus causing sedimentation and dry-caking of pigment in the can. It is evident that such sedimentation and dry-caking render proper application of such coating materials rather difficult and often cause flow or sag of the material as applied.

To prevent such sedimentation there has been suggested the addition of suspending agents of different chemical composition to such paints, enamels, lacquers, and the like coating materials, for instance, of high molecular wax-like materials, such as metal soaps, alcohol sulfonates, other anionic or cationic surface active agents, and the like. Salts of fatty acids with low-molecular amines and more particularly with low-molecular hydroxy amines have also been used for this purpose. These salts prevent sedimentation of pigments in lacquers in the presence of small amounts of water.

Such known suspending agents, however, have often an adverse effect upon the properties of the coating obtained on applying such coating materials. For instance, they reduce the strength properties of the coating, its adherence to the coating surface, the fastness to light of such coatings, its resistance to moisture and water, and the like.

It is one object of the present invention to provide new and valuable suspending agents for pigment-containing lacquers, paints, enamels, film-forming plastic solutions, emulsions, dispersions and the like coating materials, which suspending agents are free of the disadvantages of the known suspending agents and prevent sedimentation and dry-caking of pigments and other finely pulverized fillers in such coating materials.

Another object of the present invention is to provide a process of preventing sedimentation and dry-caking of pigments and other finely pulverized fillers in pigment-containing paints, enamels, lacquers, film-forming plastic solutions, dispersions, suspensions, and other coating materials.

A further object of the present invention is to provide new and valuable salts of specific, preferably high-molecular organic bases with inorganic or organic acids or compounds of acid reaction, which salts are useful suspending agents for pigment-containing paints, enamels, lacquers and other pigment-containing film-forming plastic solutions, emulsions, dispersions, and the like coating materials.

Still another object of the present invention is to provide a simple and effective process of producing such new and valuable salts of high-molecular organic bases with inorganic or organic acids or with compounds of acid reaction.

Other objects of the present invention and advantageous features thereof will become apparent as the description proceeds.

In principle, the new and valuable suspending agents according to the present invention are salts of high-molecular organic bases, such as polyamines, basic polyamides, etc. with inorganic or organic acids and, more particularly, with phosphoric acids, diesters of glycols or polyglycols wherein part of the hydroxyl groups is esterified with saturated or unsaturated fatty acids having 10–18 carbon atoms and the remainder with saturated or unsaturated dicarboxylic acids. The basic polyamide is, for instance, the condensation product of a polyamine such as ethylene diamine with dimeric or trimeric unsaturated fatty acids, such as linoleic acid. Such polyamides are sold, for instance, under the trademark "Nordac" by the General Mills Research Laboratory, Minneapolic, Minn.

Other salts of this type are salts of the following Formula I

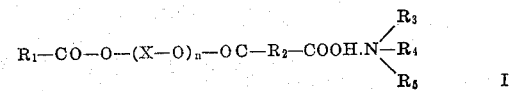

wherein

X is an alkylene radical with 2 or 3 carbon atoms;
R₁ represents an alkyl radical having 9 to 23 carbon atoms which alkyl radical may contain one or more double bonds and may be substituted by a hydroxyl group, such as the radicals of saturated or unsaturated higher fatty acids;
R₂ represents a saturated or unsaturated alkylene radical having 2 to 3 carbon atoms which may be substituted by a hydroxyl group and/or a carboxyl group, or a phenylene radical;
R₃ and R₄ represent hydrogen, a lower alkyl radical, especially a methyl radical, a lower alkyl radical substituted by a hydroxyl group, especially a β-hydroxy ethyl group, or a cyclohexyl radical; and
R₅ represents a lower alkyl radical substituted by a hydroxyl group, especially a β-hydroxy ethyl group or a cyclohexyl radical, while
n is an integer from 4 to 25.

Not only polyethylene glycols but also other straight chain or branched polyalkylene glycols, for instance, polypropylene-1,3-glycols or polypropylene-1,2-glycols, may be used likewise. However, polyethylene glycols having a molecular weight between about 200 and about 1000 are the preferred compounds. One of the two hydroxyl groups of the polyalkylene glycol compound is esterified with a fatty acid which may be saturated or may contain one or more double bonds. Such fatty acids may also be substituted by a hydroxyl group. Not only the pure fatty acids but also mixtures thereof as they are obtained from natural fats and oils, for instance, tall oil, castor oil, linseed oil, or the like can be used for esterification. Synthetic fatty acids and mixtures thereof may also be employed for the preparation of the salts according to the present invention.

The other hydroxyl group of the polyalkylene glycol is mono-esterified with a saturated or unsaturated di- or polycarboxylic acid or their substitution products, such as hydroxy- or amino-substituted di- or polycarboxylic acids.

The free carboxyl group, or groups, of the resulting diester compound is converted into the new salts by neutralization by means of a, preferably slightly water-soluble, organic base, such as dimethyl cyclohexyl amine, dicyclohexyl amine, and the like. Water soluble bases may also be used provided the resulting salts are slightly water soluble. Such slightly water-soluble salts are formed, for instance, with the water-soluble triethanol amine.

According to another embodiment of the present invention valuable antisedimentation agents are compounds wherein the polyalkylene glycol is replaced by a polyalcohol having 3 to 6 hydroxyl groups, such as glycerol, hexane triol, trimethylol propane, pentaerithrytol, sorbitol, and the like. Basic alcohols with at least 3 hydroxyl groups, such as triethanolamine may also be used for esterification. Such compounds due to their basic character, are capable of further chemical reactions.

These polyalcohols are esterified, on the one hand, by the saturated or unsaturated fatty acids, preferably fatty acids having 10 to 20 carbon atoms as they are used in the esterification of one of the two hydroxyl groups of the polyalkylene glycol forming the compounds of Formula I.

The remaining hydroxyl groups of said polyalcohols are esterified, on the other hand, with one of the carboxyl groups of a saturated or unsaturated di- or polycarboxylic acid, such as phthalic acid or maleic acid while at least one of the carboxyl groups of said acids remains unesterified and is used for salt formation with organic bases, preferably higher molecular amines.

Esterification of such polyalcohols permits the preparation of acid polyesters which contain, depending upon their number of alcoholic hydroxyl groups one or several saturated or unsaturated fatty acid radicals and, which are further esterified, depending on the number of hydroxyl groups not esterified by such fatty acids, with one or more moles of saturated or unsaturated di- or polycarboxylic acids or their derivatives and substitution products.

Thus this advantageous embodiment of the present invention yields acid polyesters which, depending upon the kind of polyalcohol used, possess $n$ minus at least one fatty acid ester groups wherein $n$ indicates the number of hydroxyl groups present in said polyalcohol while the unesterified hydroxyl group or groups are esterified by $m$ minus at least one carboxyl group of the di- or polycarboxylic acid used. It is evident that the resulting acid polyesters may contain one or more fatty acid ester groups and/or one or more polycarboxylic acid ester groups with free carboxyl groups. It is also possible to prepare acid polyesters wherein not all the hydroxyl groups are esterified so that the remaining free alcoholic hydroxyl groups can be subjected to further reactions.

The new salts are prepared, according to the present invention, by reacting, for instance, polyamines with such inorganic or organic acids or compounds of acid reaction. The preferred salts, however, are salts of acids with basic condensation products of polyamines with unsaturated fatty acids of the consistency of a soft resin, which basic condensation products are used in place of the polyamines for salt formation.

As stated above, phosphoric acids are suitable inorganic acid components of the new salts. Higher molecular unsaturated fatty acids and their polyester derivatives with polyalcohols have proved to be especially suitable organic acids for salt formation.

The acid diesters of ethylene glycol and polyglycols are prepared by first reacting said glycols and polyglycols with a saturated or unsaturated fatty acid having 10 to 18 carbon atoms and subsequently with a saturated or unsaturated dicarboxylic acid.

Salt formation is preferably effected in polar and non-polar solvents wherein the new salts are soluble. The resulting solution can directly be added as suspending and antisedimentation agent to the lacquers and other film-forming compositions.

The acid diesters of glycol and polyglycols are prepared, for instance, by heating a mixture of the polyalkylene glycol compound and a fatty acid, for instance, a fatty acid mixture obtained from tall oil, castor oil, or the like, to a temperature of about 205° C. in the presence of a dehydrating agent such as boric acid anhydride, while passing nitrogen through the reaction mixture. After the calculated amount of water has been distilled off, the resulting mono-ester compound is cooled to about 140° C. The di- or polycarboxylic acid compound is then added and the mixture is again heated to about 220° C. in the presence of boric acid anhydride while passing nitrogen therethrough. As soon as mono-esterification of the di- or polycarboxylic acid is completed, the mixture is cooled. The resulting oily di-ester is then mixed with the stoichiometric amount of the respective polyamine or basic condensation product of such a polyamine with an unsaturated fatty acid, preferably in the presence of an organic solvent, such as xylene or mixtures of xylene and butanol.

The acid polyesters of polyalcohols with fatty acids on the one hand and polycarboxylic acids on the other hand are prepared in a similar manner by heating the polyalcohol with the desired fatty acid, preferably in an inert gas atmosphere whereby the resulting water is removed and then reacting the resulting ester with free hydroxyl groups with the di- or polycarboxylic acid at a higher temperature. Salt formation is effected, preferably also in a polar or non-polar solvent or a mixture thereof, by neutralization of the free carboxylic acid group with a high molecular polyamine or an acylated polyamine having at least one free amino group, i.e., a polyamide amine. Depending upon the basicity and molecular size of the polyamine or polyamide amine used, salts are obtained of excellent solubility in both polar as well as non-polar organic solvents and stability of the solutions while the solubility in water is rather limited. The preferred and most suitable basic compounds used for salt formation are, for instance, the reaction product of one mole of dipropylene triamine with one mole or two moles of castor oil fatty acids or, respectively, the reaction product of two moles of dipropylene triamine with one mole of adipic acid and one mole of soybean oil fatty acids.

In general the salts according to the present invention are slightly water-soluble, but readily soluble in almost all organic solvents, even in non-polar solvents. Therefore, they can be mixed with paints, lacquers, and other plastic film-forming compositions without rendering the lacquer film or coating sensitive to water. The new salts do not impair the other properties of the films and coatings.

The new salts do not produce any of the adverse effects of known anti-sedimentation agents upon the lacquer film, such as swelling, retardation of the drying process, causing disturbances in the flow of the lacquer and the like coating composition, and even rust-formation underneath the lacquer film or coating. Ordinarily, addition of an amount of 0.1% to 2.0% of said new suspending salt, calculated for the solid content of the paint, enamel, lacquer, and other film-forming composition, is sufficient to reliably prevent any sedimentation of the solid matter contained therein for a prolonged period of time. The salts are preferably added to the lacquer and other film-forming compositions in the form of their solutions in suitable lacquer solvents. Such solutions may be added during the manufacture of the lacquer and the like film-forming composition or after their manufacture. If the solution is added during the manufacturing process, such addition facilitates also wetting of the pigments and has a viscosity lowering effect.

The new salts and especially the salts prepared from acid esters of polyalcohols may also be added to other suspensions, dispersions, or adhesive compositions which contain pigments or fillers. They do not only serve as sedimentation preventing agents but also as wetting or dispersing agents. They greatly facilitate finely grinding of pigments and fillers and their impregnation with or distribution throughout the binding agents. They permit application of paints and lacquers to moist undercoatings or priming coats. They also have an excellent anticorrosive and antifouling effect.

The particular advantage of the new salts according to the present invention consists in the possibility of varying their properties in accordance with the desired purpose by optionally varying the fatty acid moiety and/or the di- or polycarboxylic acid moiety of the ester.

For instance, if unsaturated dicarboxylic acids, such as maleic acid, are used, the resulting salts are capable of additive polymerization. On the other hand, if the polyalkylene glycol or the polyalcohol is esterified with a fatty acid containing several double bonds, such as linseed oil or tall oil fatty acids, oxygen-linked polymerization is possible. By combining these two possibilities, products are obtained which prevent settling of the pigments in pigment containing paints, lacquers and the like film-forming solutions, emulsions or dispersions and which, after evaporation of the solvent or after demulsification of emulsions, participate in the film formation and act at the same time as binding agents in the solid phase. Such an effect could not be achieved by using the heretofore known suspending agents. In the dry lacquer film or coating they behave like materials related to the lacquer film or coating. On baking they become frequently a component of the lacquer film or coating due to cross-linkage with the film-forming material. They do not volatilize but considerably increase the adhesiveness of the lacquer and the like coating to metallic surfaces. The drying time is even accelerated especially when the fatty acid moiety in the acid esters of polyalcohols is derived from oxidatively drying unsaturated fatty acid.

In addition to these valuable properties, the salts according to the present invention have other advantageous properties which are of value in the lacquer and the like art. For instance, they impart to the resulting film a high luster, excellent adhesiveness, and a smooth surface. They furthermore do not thicken the paints, lacquers, or synthetic resin compositions during storage; they do not attack metallic surfaces to which they are applied; and they readily form stable dispersions even with heavy pigments, such as barite. It may also be mentioned that their addition markedly improved the flow of the paint, lacquer, or the like dispersion and does not decrease the resistance to water of the resulting film or coating.

It is, of course, understood that not only neutral salts can be produced, but also basic salts or acid salts by varying the amount of acid added to the basic component. As a result thereof, the new salts can be used for lacquer and the like film-forming compositions of the most varied composition by selecting the most suitable different solvents for each type of coating composition.

The new suspending salts can also be used in mixture with other suitable suspending agents if this is desired for any particular purpose.

The following examples serve to illustrate the preparation of the new salts and of solutions thereof as well as their use as suspending agents in pigment-containing paints, enamels, lacquers, film-forming plastic solutions, emulsions, dispersions, or other coating materials, without, however, limiting the invention to said examples.

*Example 1*

200 g. (1 mole) of polyethylene glycol with an average molecular weight of 200 and 286 g. (1 mole) of castor oil fatty acids are gradually heated to 200° C. in the presence of 0.6 g. of boric acid anhydride, while passing nitrogen through the reaction mixture. The mixture is kept at said temperature until the stoichiometric amount of water is distilled off. The resulting mono-ester is cooled to 140° C. and 98 g. (1 mole) of maleic acid anhydride are added thereto. The mixture is again gradually heated to and kept at 200° C. for 1 hour. The reaction product is allowed to cool, whereby the acid oily diester is obtained in the form of a dark viscous oil.

33.2 kg. of said acid diester are dissolved in 20 kg. of xylene. A solution of 16.8 kg. of a basic polyamide of soft resinlike consistency with an H-active equivalent weight of 300, as sold by the firm Badische Anilin- und Soda-Fabrik A.G., Ludwigshafen, Germany, under the trademark "Laromid R," in 22 kg. of xylene and 8 kg. of butanol is gradually added thereto while stirring. The temperature during addition is maintained between about 40° C. and about 50° C. Subsequently, stirring of the mixture is continued at said temperature for 2 hours. In this manner a 50% solution of the neutral salt is obtained.

The product "Laromid R" represents the reaction product of a lower polyamine, such as ethylene diamine, diethylene triamine, or triethylene tetramine with monomeric unsaturated fatty acids such as linoleic acid, castor oil fatty acids, tall oil fatty acids, and mixtures thereof.

The H-active equivalent weight of 300 mentioned hereinabove indicates the amount of 300 parts by weight "Laromid R" which are neutralized by one gram mole of H-ions, i.e., one mole of a monobasic acid.

0.5 kg. of said solution are added to 100 kg. of a synthetic resin lacquer paint containing chrome yellow and blanc fixe, The synthetic resin lacquer paint used is of the following composition:

200 g. of chrome yellow,
200 g. of barite (blanc fixe),
100 g. of zinc oxide,
235 g. of linseed oil-modified alkyd resin (sold by Farbenfabriken Bayer, Leverkusen/Germany, under the trademark "Alkydal L Extra"),
250 g. of white spirit,
50 g. of turpentine,
30 g. of xylene,
10 g. of butanol
10 g. of a 50% (w./v.) solution of xylenols dissolved in dipentene,
10 g. of a 33% (w./v.) solution of cobalt-lead-manganese naphthenate dissolved in xylene.

The resulting lacquer does not show sedimentation of the pigments for several months. Without the addition of the suspending salt according to this example, a solid hard cake of the pigments is formed after standing for 7 days.

Addition of the new suspending salt, does not in the least impair the advantageous properties of the base lacquer and film formation.

*Example 2*

A solution of 28.1 kg. of the same basic polyamide as used in Example 1, in 25 kg. of xylene and 5 kg. of butanol are added to a solution of 21.9 kg. of tall oily fatty acids in 20 kg. of xylene. The temperature and the other reaction conditions are the same as used in Example 1. A 50% light yellow, viscous, odorless solution of the corresponding neutral salt is obtained thereby.

0.4 kg. of said salt solution are added to a lacquer containing 100 kg. of solid matter. The salt addition has an excellent sedimentation inhibiting effect.

The lacquer used has the following composition:

75 g. of linseed oil,
75 g. of tung oil,
150 g. of copal resin KK4 sold by the firm Worlee, of Bremen, Germany,
1,200 g. of linseed oil-modified alkyd resin Alkydal L Extra (Bayer), 1,000 g. of white spirit,
150 g. of xylene, and
50 g. of butanol.

To each 470 g. of such a synthetic resin lacquer are added:

200 g. of chrome yellow,
200 g. of barite (blanc fixe),
100 g. of zinc oxide,
150 g. of white spirit,
30 g. of turpentine,
15 g. of xylene,
5 g. of butanol, and
10 g. of a 33% (w./v.) solution of cobalt-lead-manganese naphthenate in xylene.

Example 3

A solution of 14.2 kg. of the basic polyamide used in Example 1 in 24.1 kg. of butanol and 24.1 kg. of xylene is added to 11.6 kg. of 85% ortho-phosphoric acid while stirring. The temperature during addition is maintained below 80° C. by cooling. Thereby, a slightly yellow viscous solution of a pH of 6.0 is obtained.

A pigment-containing priming varnish consisting of 21 kg. of chrome yellow, 21 kg. of barite, 5.3 kg. of titanium dioxide, and 52.7 kg. of a nitro cellulose lacquer is adjusted to a viscosity of 50 seconds/20° C., determined in the Ford beaker 4 mm., by the addition of a sufficient amount of a mixture of 10 kg. of acetic acid butyl ester, 25 kg. of acetic acid ethyl ester, 2 kg. of butanol, 4 kg. of ethanol, 4 kg. of xylene, and 8 kg. of toluene.

The nitro cellulose lacquer (unpigmented) used has the following composition:

200 g. of collodion cotton E730, manufactured by the Walsroder Zellstoffwerk, of Walsrode, Germany,
288 g. of collodion cotton E330, manufactured by the Walsroder Zellstoffwerk, of Walsrode, Germany,
128 g. of propyl glycol ether,
96 g. of glycolic acid butyl ester,
60 g. of dibutyl phthalate,
1,400 g. of acetic acid ethyl ester,
640 g. of acetic acid butyl ester,
256 g. of butanol,
1,703 g. of toluene,
100 g. of xylene
310 g. of a mixture of 5% of lactic ethyl ester, 5% of glycolic acid butyl ester, and 90% of cymene,
152 g. of benzene (pure),
88 g. of a resinous condensation product of carbamic acid butyl ester with formaldehyde, sold under the trademark "Uresin B" by Farbwerke Hoechst of Frankfurt/Main-Hoechst, Germany,
124 g. of lactic acid ethyl ester,
600 g. of spirit (ethanol)
769 g. of an oil-modified dried alkyd resin containing 58% of phthalate and 42% of dehydrated ricinoleic acid, sold under the trademark "Beckosol 5" by Beckacite, Hamburg, Germany.

0.5 kg. of the above mentioned solution of the salt of ortho-phosphoric acid with the basic polyamide are added to said priming varnish. The addition prevents sedimentation of the pigments on storage for several months. Without addition of the salt according to the present invention there is obtained a hard sediment after a short period of time. The resulting lacquer film obtained with such a priming varnish according to the present invention is homogeneous and insensitive to water.

Example 4

A mixture of 200 g. of polyethylene glycol of an average molecular weight of 200, and 290 g. of tall oil fatty acids is gradually heated to 205° C. in the presence of 0.5 g. of boric acid anhydride, while passing nitrogen through the reaction mixture. The mixture is kept at said temperature until the stoichiometric amount of water is distilled off. The resulting mono-ester compound is cooled to 140° C. and 98 g. of maleic acid anhydride are added thereto. The mixture is again gradually heated to and kept for one hour at 200° C. After filtering, the reaction product is allowed to cool whereby the oily diester is obtained as a dark viscous oil.

The crude diester is converted into its salt by mixing with the calculated amount of dimethyl cyclohexylamine, i.e., 127 g. Thereby, the dimethyl cyclohexylamine salt is obtained in the form of an oil.

The crude salt is readily dissolved in 698 g. of xylene to yield a 50% solution which can directly be used as suspending agent. The solution is clear and stable, even at low temperatures. It can be diluted in any desired proportion with xylene or other conventional lacquer solvents and is compatible with almost any kind of lacquer, paint, enamel, or other plastic solution.

Example 5

Equimolecular amounts of polyethylene glycol with an average molecular weight of 200, castor oil fatty acids, and maleic acid are esterified in the same manner as described in Example 4. The resulting diester is an oil. The crude ester is diluted with xylene and then neutralized with an equimolecular amount of dimethyl cyclohexylamine by following the procedure described in Example 4. Thereby a clear and stable 50% solution of the new salt is obtained which can directly be used as suspending agent.

The salt is recovered from said xylene solution by distilling off the solvent in a high vacuum. It is obtained in the form of a yellow oil.

The xylene solution of the crude salt can directly be added to paints, lacquers, and the like compositions to prevent sedimentation of pigments even on prolonged storage.

Example 6

1.000 g. of a polyethylene glycol having an average molecular weight of 1000, 280 g. of linseed fatty acids, and 132 g. of a mixture of phthalic acid and maleic acid in the proportion 1.3:1, the amount of said mixture corresponding to 1 mole of said fatty acid ester, are esterified in the same manner as described in Example 4. The resulting diester is an oil.

The crude ester is neutralized by the addition of the required amount of cyclohexylamine (about 100 g.).

The resulting salt forms a pale yellow mobile oil. It is diluted with an amount of dipentene sufficient to yield a 60% solution. Said solution can directly be added to paints, lacquers, and the like compositions as suspending agent according to the present invention.

Example 7

1.000 g. of polyethylene glycol of an average molecular weight of about 1000, 300 g. of castor oil fatty acids, and 192 g. of citric acid are esterified as described in Example 4. The resulting ester is a viscous oil.

The crude ester is neutralized by the addition of triethanolamine (about 149 g.). The resulting salt is obtained in the form of a yellow oil. It is added as such or, after dilution with hydrocarbon thinners, such as petroleum solvent naphtha with 90–95% of aromatic components and the like, to paint, lacquer and the like compositions and serves as suspending agent preventing sedimentation of the pigments in such compositions.

Example 8

350 kg. of a 70% solution of an alkyd resin sold under the trademark "Alkydal L Extra," in white spirit,
200 kg. of chrome yellow,
200 kg. of barite,
100 kg. of zinc oxide,
170 kg. of white spirit,
50 kg. of a solvent mixture sold under the trademark "Byketol,"

8 kg. of butanol
10 kg. of 50% solution of xylenol in Dipentene, and
8 kg. of a cobalt-manganese siccative 1:2 dissolved in xylene sold under the trademark "Soligen"

are intimately mixed. 3.8 kg. of a 50% xylene solution of the neutral salt prepared according to Example 4 are admixed to the resulting base lacquer in order to prevent sedimentation of the pigments.

Without the addition of the suspending agent according to the present invention, the pigments of the above given mixture settle after a short period of time and form a solid hard cake which can be redispersed by stirring with difficulty only. In contrast thereto, the lacquer according to this example does not form a sediment even after 4 weeks. The addition of the new suspending agent does not in the least impair the advantageous properties of the lacquer without such an addition.

*Example 9*

470 kg. of a fatty acid modified varnish of the copal-ethoxyline-alkyd resin type containing 50% of the binding resin, xylene as solvent, and 0.8% of a cobalt-manganese siccative, dissolved in xylene,
200 kg. of chrome green,
200 kg. of barite,
50 kg. of titanium oxide,
50 kg. of lithopone,
150 kg. of white spirit,
10 kg. of butanol,
30 kg. of a solvent sold under the trademark "Byketol," and
10 kg. of a 50% solution of xylenole in dipentene are intimately mixed with 3 kg. of a 50% xylene solution of the neutral salt prepared according to Example 5. The addition of this suspending agent considerably retards sedimentation of the pigments.

After standing for 4 weeks, only small amounts of pigments have precipitated. The precipitate can readily be redispersed by stirring.

*Example 10*

92 g. (1 mole) of anhydrous glycerol are heated with 597 g. (2 moles) of castor oil fatty acids with the addition of 0.2 g. of boric acid anhydride in an esterification apparatus consisting of a three-necked flask provided with water separator, reflux condenser, and agitating device, while passing nitrogen therethrough. As soon as a temperature of about 100° C. has been attained, the agitator is started to operate. Reaction sets in at about 130° C. Thereafter, the temperature is slowly increased to 220–230° C. and the reaction mixture is kept at said temperature until separation of water is completed or, respectively, the acid number has decreased to 5. This is ordinarily achieved after heating for 2 hours to 3 hours. The resulting ester has a saponification number of 165.

The reaction mixture is allowed to cool to 140° C. 98 g. (1 mole) of maleic acid anhydride are added thereto. The mixture is heated to 180° C. and kept at said temperature for about one hour. A faintly yellowish oil of medium viscosity is obtained. It is soluble in most lacquer solvents and represents an acid polyester. Its acid number is 56, its saponification number is 283.

200 g. of said acid polyester are dissolved in 200 g. of a mixture of two parts of butanol and three parts of xylene. A solution of 200 g. of the hereinafter described polyamine amide in 200 g. of butanol-xylene mixture (1:3) is added thereto. Said polyamine amide was prepared by heating one mole of dipropylene triamine and two moles of tall oil fatty acids at 160–170° C. for about one hour whereby two moles of water were split off and removed. After neutralization of the acid polyester by means of said polyamine amide, a clear yellowish solution is obtained which can be used as such as antisedimentation agent and which contains 50% of the active agent in the form of the high molecular amine salt of the polyester.

*Example 11*

One mole of glycerol is reacted first with 552 g. (two moles) of soybean oil fatty acids and subsequently with one mole of maleic acid anhydride as described in Example 10. A light yellowish oil is obtained which has an acid number of 76, a saponification number of 319 and an iodine number of 95.6.

200 g. of said polyester are dissolved in 240 g. of a mixture of xylene and butanol (1:1). The solution is neutralized by the addition of 40 g. of the polyamine sold under the trademark "Laromin C 252" which is a cycloaliphatic polyamine of the firm Badische Anilin- und Sodafabrik of Ludwigshafen (Rhein), Germany. The resulting clear yellowish solution of low viscosity contains 50% of the antisedimentation agent and is added in this form to the lacquer.

*Example 12*

One mole of glycerol is reacted first with 596 g. (two moles) of tall oil fatty acids and then with 138 g. (one mole) of phthalic acid anhydride as described in Example 10. 200 g. of the resulting acid oil are dissolved in 200 g. of a mixture of butanol and xylene (1:3). Said solution is neutralized by the addition of 160 g. of a 50% solution of the high molecular polyamide amine sold under the trade mark "Laromine R." The neutralized solution is used as antisedimentation agent.

*Example 13*

134 g. (one mole) of trimethylol propane are reacted first with 596 g. (two moles) of castor oil fatty acids and then with 98 g. (one mole) of maleic acid anhydride as described hereinabove in Example 10. A clear, light, viscous oil of the acid number 54 and the saponification number 290 is obtained.

250 g. of said acid polyester are dissolved in a mixture of 120 g. of butanol and 120 g. of xylene. 70 g. of a 50% solution of the reaction product of one mole of adipic acid and two moles of dipropylene triamine in a mixture of butanol and xylene (1:1) are added thereto in order to neutralize the acid polyester. The polyamide amine used for neutralization is prepared by heating adipic acid and dipropylene triamine at 170–180° C. for half an hour until the stoichiometrically calculated amount of water has been split off.

The resulting neutralized salt solution is of slightly yellowish color and medium viscosity and is used as antisedimentation agent.

*Example 14*

135 g. (one mole) of 1,2,6-hexanetriol are reacted first with 552 g. (two moles) of soybean oil fatty acids and then with 98 g. (one mole) of maleic acid anhydride, as described hereinabove in Example 10. The resulting acid ester has about the same color as the acid ester obtained according to Example 13. However, its viscosity is lower. Its acid number is 75 and its saponification number is 286.

200 g. of said acid polyester are dissolved in a mixture of 100 g. of butanol and 100 g. of xylene. The solution is neutralized by the addition of 55 g. of a 50% solution of the hereinafter described polyamine amide in butanol. Said polyamine amide is prepared by heating one mole of phthalic acid anhydride with two moles of dipropylene triamine to 170–180° C. for about ½ hour. The resulting clear solution of the neutralized salt of the polyester is used as antisedimentation agent, as wetting agent, and as auxiliary agent in the grinding of pigments. It is also useful as antistatic agent.

*Example 15*

136 g. (one mole) of pentaerythritol are reacted first with 894 g. (three moles) of ricinoleic acid and then with 98 g. (one mole) of maleic acid anhydride as described hereinabove in Example 10. A turbid viscous oil of the acid number of 36 and a saponification number of 251 is obtained.

250 g. of said oil are dissolved in a mixture of 125 g. of a solvent mixture rich in aromatic compounds which is sold by the German Shell A.G. under the trademark "Octaro" and 125 g. of butanol. 100 g. of a 50% solution of a polyamine amide obtained by condensation of phthalic acid and tall oil fatty acid with dipropylene triamine are added thereto to yield a solution of the neutral salt (pH 7.0). A slightly turbid solution of medium viscosity is obtained. It contains 50% of the active salt and may be used for the same purposes as mentioned in Example 14.

*Example 16*

136 g. (one mole) of pentaerythritol are reacted first with 600 g. (two moles) of coconut oil fatty acids and then with 98 g. (one mole) of maleic acid anhydride as described hereinabove in Example 10. The reaction product is a yellowish paste-like mass of an acid number of 70 and a saponification number of 339.

300 g. of said acid polyester are dissolved in a mixture of 140 g. of xylene and 200 g. of isopropanol. About 40 g. of tetra-ethylene pentamine are added thereto until the acid polyester is neutralized. The solution is used for the same purposes as mentioned in Example 14.

*Example 17*

182 g. (one mole) of sorbitol are reacted first with 895 g. (three moles) of ricinoleic acid and then with 98 g. (one mole) of maleic acid anhydride as described hereinabove in Example 10. A brown, clear, viscous oil of the acid number of 44 and the saponification number of 266 is obtained.

200 g. of said acid polyester are dissolved in 250 g. of the mixture of three parts of xylene and one part of diacetone alcohol. The long-chain aliphatic polyamine sold under the trademark "Laromin 1035" is added to said solution in order to neutralize the acid polyester. The resulting solution containing about 50% of the salt is admixed to various lacquer compositions and serves therein as antisedimentation agent.

*Example 18*

3720 g. of castor oil, 149 g. of triethanolamine, and 92 g. of glycerol are heated at 175–185° C. for two hours. A neutral oil is obtained which contains the diricinoleic acid ester of the triethanol amine as well as the diricinoleic acid ester of glycerol. This reaction mixture is condensed, after cooling for a short period of time, with 576 g. of maleic acid anhydride by heating at 180–190° C. for one hour. A mixture of acid polyesters is obtained thereby. Said mixture is neutralized by the addition of the polyamine amide described in Example 15. The neutralized salt is adjusted to a 50% active agent content by the addition of a mixture of butanol and xylene (1:3). The resulting solution has excellent antisedimentation properties.

*Example 19*

134 g. (one mole) of hexanetriol and 86 g. (one mole) of butine-(2)-diol-(1,4) are condensed as described in Example 10 with 894 g. (three moles) of ricinoleic acid. The resulting esters are converted into a mixture of acid polyesters by the subsequent reaction with 196 g. (two moles) of maleic acid anhydride.

The acid polyester mixture obtained in this manner is neutralized by the addition of the fatty acid polyamide amine sold under the trademark "Laromid R" and is adjusted by the addition of a mixture of xylene and butanol (1:3) to a content of 50% of the active agent. The resulting solution of the antisedimentation agent is especially suitable for lacquer compositions which contain acid flowing agents such as benzoic acid or crotonic acid.

The above described antisedimentation solutions of Examples 10 to 19 are added in amounts between about 0.1% and about 2.0% and preferably between about 0.4% and about 1.0%, calculated for the total solids content, to lacquer compositions, for instance, of the composition given hereinafter. It was found that, even after a storage for several months, either no sediment was formed, or that a sediment formed could very readily be redistributed within the lacquer. In contrast thereto, lacquers of the same composition but without the addition of the antisedimentation agents according to the present invention showed, after storage for only a few days, hard sediments which could be redistributed with great difficulty only. It is, of course, understood that other lacquers may also be used than those given in the following examples.

*Example 20*

Alkyd resin lacquer containing linseed oil-modified alkyd resin, sold under the trademark "Alkydal L Extra"

350 g. of Alkydal L Extra in a 67% solution, in white spirit,
200 g. of chrome yellow,
200 g. of barite,
100 g. of zinc oxide,
228 g. of diluting solvent (mixture of xylene and butanol 1:3), and
10 g. of the antiskinning agent sold under the trademark "Anti–Pelle," i.e., of a 50% solution of xylenol in dipentene.

*Example 21*

Alkyd resin lacquer containing the soybean oil-modified alkyd resin sold under the trademark "Resoalkyd 63S."

375 g. of Resoalkyd 63S in a 60% solution, in white spirit,
175 g. of titanium dioxide,
350 g. of barite, and
100 g. of white spirit.

*Example 22*

Alkyd resin lacquer containing soybean oil-modified alkyd resin sold under the trademark "Alkydal S65" and cyclohexanone resin sold under the trademark "Kunstharz AFS" by the firm Farbwerke Bayer of Leverkusen, Germany.

50 g. of Alkydal S65,
10 g. of Kunstharz AFS,
6 g. of white spirit,
17 g. of xylene,
3 g. of a solution of 1 part of cobalt-lead-manganese naphthenate, in 3 parts of xylene,
30 g. of chrome yellow, and
30 g. of barite.

*Example 23*

Lacquer containing tall oil-modified alkyl resin sold under the trademark "Talphthalat 551."

60 g. of Talphthalat 551,
50 g. of white spirit
27 g. of xylene,
3 g. of the solution of cobalt-lead-manganese naphthenate, 1:3 in xylene,
15 g. of chrome yellow,
15 g. of chrome green,
20 g. of barite, and
10 g. of zinc oxide.

Of course, the salt solutions obtained according to the present invention can be diluted with other solvents, for instance, with hydrocarbon fillers, such as petroleum solvent naphtha with 90–95% of aromatic components, cymene, toluene, dipentene, methyl isobutyl ketone, ethyl amyl ketone, butyl acetate and the like.

In place of the fatty acids used in the preceding examples, there may be employed other fatty acids, such as fatty acids having 10 to 24 carbon atoms, for instance, lauric acid, palmitic acid, stearic acid, arachic acid, lignoceric acid, oleic acid, erucic acid, linoleic acid, linolenic acid, eleostearic acid, ricinoleic acid, and other natural or synthetic saturated or unsaturated, hydroxy-substituted or unsubstituted fatty acids, or mixtures thereof, or the mixtures obtained by saponification of natural oils or fats, such as rape seed oil, cotton seed oil, tung oil, peanut oil, sunflower oil, oiticica oil, fish oils, soybean oil, and others.

In place of of maleic acid, phthalic acid, and citric acid used in the preceding examples as polycarboxylic acid reactant, there may be employed equimolecular amounts of other di- and polycarboxylic acids which may be substituted by a hydroxyl group or a carboxyl group, such as tartaric acid, glutaric acid, fumaric acid, succinic acid, pyrotartaric acid, itaconic acid, malic acid, aspartic acid, glutamic acid, isophthalic acid, terephthalic acid, and others.

Esterification with such fatty acids and such polycarboxylic acids proceeds in the same manner as described in the preceding examples.

The organic bases used for salt formation in the preceding examples can be replaced by equimolecular amounts of other amino compounds, capable of forming slightly water-soluble salts with said acid diesters, such as methyl dicyclohexylamine, dicyclohexylamine, other lower dialkyl cyclohexylamines, for instance, diethyl cyclohexylamine, methyl ethyl cyclohexylamine, dimethylcyclohexylamine.

In place of the high molecular polyamide amines used as salt-forming compounds, there may be employed other high molecular basic polyamides as they are obtained, for instance, by reaction of dimeric or trimeric unsaturated fatty acids such as linoleic acid with ethylenediamine, diethylene triamine and triethylene tetramine.

Other high molecular polyamines than those used in the examples may also be employed, for instance polyamines as they are obtained by reaction of 1 mole of an epoxy resin with 2 moles of a lower polyamine. Such polyamines correspond, for instance to the formula:

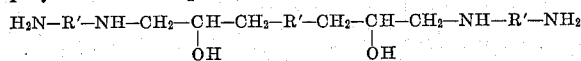

wherein R′ denotes the radicals —CH$_2$—CH$_2$—,

or

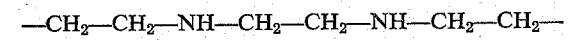

respectively. Such products are described in the monograph: "Epoxy-Resins" by Lee.

The polyalkylene glycols used in the Example 1 to 4 may be replaced by other straight-chain or branched polyalkylene glycols, for instance, polypropylene-1,3-glycols, polypropylene-1,2-glycols, polyethylene glycols, preferably having a molecular weight between about 200 and about 1000, and others.

The procedure of forming the salts of said bases with the acid polyesters according to the present invention is otherwise the same as described in the preceding examples.

The suspending agents according to the present invention cannot only be used with advantage in nitro cellulose or synthetic resin lacquers as shown in the preceding examples, but also in other film-forming compositions, such as nitro-cellulose combination lacquers, spirit varnishes, acid hardening lacquers, lacquers based on ester and/or ketone soluble polymers, lacquers based on addition polymers, and other types of pigment containing suspensions or dispersions.

Of course, many changes and variations in the composition of the new suspending salts, the amines, polyamines, and basic polyamides used for forming the salts with inorganic and organic acids and compounds of acid reaction, the solvents employed when preparing solutions of said salts, the amounts of suspending agents added to the various pigment-containing lacquers and the like film-forming compositions, the composition of the pigment-containing lacquers, varnishes, paints, enamels, film-forming plastic solutions, emulsions, suspensions, and other film-forming coating materials, the pigments and filler materials added to such lacquers and the like film-forming compositions, the method of preparing the suspending salts according to the present invention, and the like may be made by those skilled in the art in accordance with the principles set forth herein and in the claims annexed hereto.

I claim:
1. The salt of a basic polyamide with the acid diester of a polyalkylene glycol, the one ester group of said diester being a higher fatty acid ester group with 10 to 18 carbon atoms, and the other ester group being a polycarboxylic acid mono-ester group, said salt being soluble in organic lacquer solvents.

2. The salt of a basic polyamide condensation product of a polyamine and an unsaturated fatty acid with the acid diester of a polyalkylene glycol, the one ester group of said diester being a higher fatty acid ester group with 10 to 18 carbon atoms, and the other ester group being a polycarboxylic acid mono-ester group, said salt being soluble in organic lacquer solvents.

3. The salt of the basic polyamide condensation product of ethylene diamine and an unsaturated higher fatty acid, with the acid diester of polyethylene glycol one of its hydroxyl groups being esterified by castor oil fatty acids and the other being semi-esterified by maleic acid, said salt being soluble in organic lacquer solvents.

4. The salt of the basic polyamide condensation product of ethylene diamine and an unsaturated higher fatty acid, with tall oil fatty acids, said salt being soluble in organic lacquer solvents.

5. The salt of the basic polyamide condensation product of ethylene diamine and an unsaturated higher fatty acid, with ortho-phosphoric acid, said salt being soluble in organic lacquer solvents.

6. The salt of a high molecular organic base selected from the group consisting of a polyamine selected from the group consisting of an aliphatic polyamine with 2 to 8 carbon atoms and 2 to 5 amino groups and the reaction product of such a polyamine with an epoxy resin in the molar proportion of 2:1, a basic polyamide selected from the group consisting of the polyamide of an aliphatic polyamine with 2 to 8 carbon atoms and 2 to 5 amino groups and an unsaturated higher fatty acid with 10 to 24 carbon atoms and the polyamide of an aliphatic polyamine with 2 to 8 carbon atoms and 2 to 5 amino groups and a polycarboxylic acid and mixtures of said bases with an acid polyester of a polyalcohol with at least three hydroxyl groups, at least one of the ester groups of said polyester being a higher fatty acid ester group with 10 to 24 carbon atoms and at least one other ester group being a polycarboxylic acid mono-ester group, said salt being soluble in organic lacquer solvents.

7. The salt of the polyamide condensation product of about one mole of dipropylene triamine and about two moles of a higher fatty acid with the acid polyester of a polyalcohol with at least three hydroxyl groups, at least one of the ester groups of said acid polyester being a higher fatty acid ether group having 10 to 20 carbon atoms and at least one other of said ester groups being a polycarboxylic acid mono-ester group, said salt being soluble in organic lacquer solvents.

8. The salt of the polyamide condensation product of about one mole of adipic acid and about two moles of dipropylene triamine, with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group, said salt being soluble in organic lacquer solvents.

9. The salt of the polyamide condensation product of about one mole of phthalic acid anhydride and about two moles of dipropylene triamine with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group, said salt being soluble in organic lacquer solvents.

10. The salt of a high molecular aliphatic polyamine with 2 to 8 carbon atoms and 2 to 5 amino groups with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group, said salt being soluble in organic lacquer solvents.

11. The salt of a high molecular organic base selected fromt he group consisting of a polyamine selected from the group consisting of an aliphatic polyamine with 2 to 8 carbon atoms and 2 to 5 amino groups and the reaction product of such a polyamine with an epoxy resin in the molar proportion of 2:1, a basic polyamide selected from the group consisting of the polyamide of an aliphatic polyamine with 2 to 8 carbon atoms and 2 to 5 amino groups and an unsaturated higher fatty acid with 10 to 24 carbon atoms and the polyamide of an aliphatic polyamine with 2 to 8 carbon atoms and 2 to 5 amino groups and a polycarboxylic acid and mixtures of said bases with an acid polyester of an aliphatic polyalcohol having 3 to 6 carbon atoms and 3 to 6 hydroxyl groups, at least one of the ester groups of said acid polyester being the castor oil fatty acid ester group and at least one other of said ester groups being the maleic acid mono-ester group, said salt being soluble in organic lacquer solvents.

12. The salt of a high molecular organic base selected from the group consisting of a polyamine selected from the group consisting of an aliphatic polyamine with 2 to 8 carbon atoms and 2 to 5 amino groups and the reaction product of such a polyamine with an epoxy resin in the molar proportion of 2:1, a basic polyamide selected from the group consisting of the polyamide of an aliphatic polyamine with 2 to 8 carbon atoms and 2 to 5 amino groups and an unsaturated higher fatty acid with 10 to 24 carbon atoms and the polyamide of an aliphatic polyamine with 2 to 8 carbon atoms and 2 to 5 amino groups and a polycarboxylic acid, and mixtures of said bases with an acid polyester of an aliphatic polyalcohol having 3 to 6 carbon atoms and 3 to 6 hydroxyl groups, at least one of the ester groups of said acid polyester being the soybean oil fatty acid ester group and at least one other of said ester groups being the maleic acid mono-ester group, said salt being soluble in organic lacquer solvents.

13. The salt of a high molecular organic base selected from the group consisting of a polyamine selected from the group consisting of an aliphatic polyamine with 2 to 8 carbon atoms and 2 to 5 amino groups and the reaction product of such a polyamine with an epoxy resin in the molar proportion of 2:1, a basic polyamide selected from the group consisting of the polyamide of an aliphatic polyamine with 2 to 8 carbon atoms and 2 to 5 amino groups and an unsaturated higher fatty acid with 10 to 24 carbon atoms and the polyamide of an aliphatic polyamine with 2 to 8 carbon atoms and 2 to 5 amino groups and a polycarboxylic acid, and mixtures of said bases with an acid polyester of an aliphatic polyalcohol having 3 to 6 carbon atoms and 3 to 6 hydroxyl groups, at least one of the ester groups of said acid polyester being the tall oil fatty acid ester group and at least one other of said ester groups being the phthalic acid mono-ester group, said salt being soluble in organic lacquer solvents.

14. The process of preventing sedimentation of pigments in pigmented paints, lacquers, and other film forming suspensions, which process comprises admixing to such a pigmented composition, as suspending and pigment sedimentation inhibiting agent, the slightly water-soluble and organic solvent soluble salt of an organic base with a polyester of a polyalcohol with at least three hydroxyl groups, said polyester having at least one free carboxylic group in its molecule.

15. The process according to claim 14 wherein the organic base is a slightly water-soluble organic amine.

16. The process according to claim 14 wherein the salt serving as suspending agent is admixed to the pigmented suspension in an amount between about 0.1% and about 2.0% calculated for the amount of pigment and other filling material present in said suspension.

17. The process of preventing sedimentation of pigments in pigmented paints, lacquers, and other film forming suspensions, which process comprises admixing to such a pigmented suspension, as suspending and pigment sedimentation retarding agent, between about 0.1% and about 2.0%, calculated for the amount of pigment and other filling material present in said suspension, of the slightly water-soluble and organic solvent-soluble salt of the formula

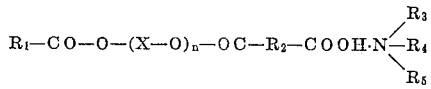

wherein

X is an alkylene radical with 2 to 3 carbon atoms;
$R_1$ represents a member selected from the group consisting of a saturated acylic hydrocarbon radical having 11 to 23 carbon atoms, a saturated acylic hydrocarbon radical having 11 to 23 carbon atoms and being subsituted by a hydroxyl group, an olefinic acylic hydrocarbon radical having 11 to 23 carbon atoms, and an olefinic acylic hydrocarbon radical having 11 to 23 carbon atoms and being substituted by a hydroxyl group;
$R_2$ represents a member selected from the group consisting of a phenylene radical, a divalent saturated acylic hydrocarbon radical, a saturated alkylene radical substituted by a member selected from the group consisting of a hydroxyl group and a carboxyl group, a divalent olefinic hydrocarbon radical, and a divalent olefinic hydrocarbon radical substituted by a member selected from the group consisting of a hydroxyl group and a carboxyl group, said divalent hydrocarbon radicals having 2 to 3 carbon atoms;
$R_3$ and $R_4$ represent members selected from the group consisting of hydrogen, a lower alkyl radical, a lower alkyl radical substituted by a hydroxyl group, and a cyclohexyl radical; and
$R_5$ represents a member selected from the group consisting of a lower alkyl radical, a lower alkyl radical, substituted by a hydroxyl group, and a cyclohexyl radical; while
$n$ is an integer ranging from 4 to 25.

18. A pigmented paint, lacquer, and the like pigmented film forming suspension of high stability on storage, said pigmented suspension comprising a vehicle, a finely divided pigment intimately and uniformly distributed throughout and suspended in said vehicle, and as suspending and pigment sedimentation retarding agent, between about 0.1% and about 2.0%, calculated for the amount of pigment and other filling material present in said suspension, of the substantially slightly water-soluble and organic solvent-soluble salt of the formula

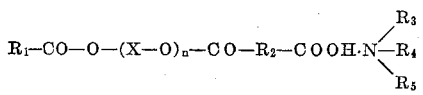

wherein

X is an alkylene radical with 2 to 3 carbon atoms;

$R_1$ represents a member selected from the group consisting of a saturated acylic hydrocarbon radical having 11 to 23 carbon atoms, a saturated acylic hydrocarbon radical having 11 to 23 carbon atoms and being substituted by a hydroxyl group, an olefinic acylic hydrocarbon radical having 11 to 23 carbon atoms, and an olefinic acylic hydrocarbon radical having 11 to 23 carbon atoms and being substituted by a hydroxyl group;

$R_2$ represents a member selected from the group consisting of a phenylene radical, a divalent saturated acylic hydrocarbon radical, a saturated alkylene radical substituted by a member selected from the group consisting of a hydroxyl group and a carboxyl group, a divalent olefinic hydrocarbon radical, and a divalent olefinic hydrocarbon radical substituted by a member selected from the group consisting of a hydroxyl group and a carboxyl group, said divalent hydrocarbon radicals having 2 to 3 carbon atoms;

$R_3$ and $R_4$ represent members selected from the group consisting of hydrogen, a lower alkyl radical, a lower alkyl radical substituted by a hydroxyl group, and a cyclohexyl radical; and $R_5$ represents a member selected from the group consisting of a lower alkyl radical, a lower alkyl radical, substituted by a hydroxyl group, and a cyclohexyl radical, while $n$ is an integer ranging from 4 to 25.

19. A pigmented paint, lacquer, and the like pigmented film forming suspension of high stability on storage, said pigmented suspension comprising a vehicle, a finely divided pigment intimately and uniformly distributed throughout and suspended in said vehicle, and, as suspending and pigment sedimentation retarding agent, the substantially slightly water-soluble and organic solvent-soluble salt of an organic base with an acid polyester of a polyalcohol with at least three hydroxyl groups, said salt being present in said pigmented paint in an amount between about 0.1% and about 2.0%, calculated for the amount of pigment and other solid material present in said suspension.

20. A pigmented paint, lacquer, and the like pigmented film forming suspension of high stability on storage, said pigmented suspension comprising a vehicle, a finely divided pigment intimately and uniformly distributed throughout and suspended in said vehicle, and, as suspending pigment sedimentation retarding agent, the substantially slightly water-soluble and xylene-soluble salt, with dimethyl cyclohexylamine, of the acid diester of polyethylene gycol, the one ester group of said diester being esterified with tall oil fatty acids and the other ester group being the mono-ester group with maleic acid.

21. A pigmented piant, lacquer, and the like pigmented film forming suspension of high stability on storage, said pigmented suspension comprising a vehicle, a finely divided pigment intimately and uniformly distributed throughout and suspended in said vehicle, and, as suspending and pigment sedimentation retarding agent, the substantially slightly water-soluble and xylene-soluble salt, with dimethyl-cyclohexylamine, of the acid diester of polyethylene glycol, the one ester group of said diester being esterified with castor oil fatty acids and the other ester group being the mono-ester group with maleic acid.

22. A pigmented paint, lacquer, and the like pigmented film forming suspension of high stability on storage, said pigmented suspension comprising a vehicle, a finely divided pigment intimately and uniformly distributed throughout and suspended in said vehicle, and, as suspending and pigment sedimentation retarding agent, the substantially slightly water-soluble and dipentene-soluble salt, with cyclohexylamine, of the acid diester of polyethylene glycol, the one ester group of said diester being esterified with linseed oil fatty acids and the other ester group being mono-esterified with a mixture of phthalic acid and maleic acid.

23. A pigmented paint, lacquer, and the like pigmented film forming suspension of high stability on storage, said pigmented suspension comprising a vehicle, a finely divided pigment intimately and uniformly distributed throughout and suspended in said vehicle, and, as suspending and pigment sedimentation retarding agent, the substantially slightly water-soluble and organic solvent-soluble salt, with triethanolamine, of the acid diester of polyethylene glycol, the one ester group of said diester being esterified with castor oil fatty acids and the other ester group being mono-esterified with citric acid.

24. The process of preventing sedimentation of pigments in pigmented paints, lacquers, and other film-forming coating compositions, said process consisting in admixing to such a pigmented composition at any stage of its manufacture, as suspending and pigment sedimentation inhibiting agent, the salt of an organic amine with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group, said salt being admixed in an amount between about 0.1% and about 2.0% calculated for the amount of pigment and other solid material present in said composition.

25. A pigmented paint, lacquer, and the like pigmented film-forming coating composition of high stability on storage, said pigmented coating composition comprising a vehicle, a finely divided pigment intimately and uniformly distributed throughout and suspended in said vehicle, and, as suspending and pigment sedimentation retarding agent, between about 0.1% and about 2.0%, calculated for the solid matter content of such coating compositions, of the salt of an organic amine with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group.

26. A sedimentation retarding composition for pigment-containing coating compositions consisting of a solution of the salt of an organic base with a polyester of a polyalcohol with at least three hydroxyl groups, said polyester having at least one free carboxyl group in its molecule, in an organic solvent miscible with said coating composition.

27. A sedimentation retarding composition for pigment-containing coating compositions consisting of a solution of the salt of a high molecular organic base selected from the group consisting of a polyamine, a basic polyamide, and mixtures of said bases with the acid polyester of a polyalcohol with at least three hydroxyl groups, at least one of the ester groups of said acid polyester being a higher fatty acid ester group having 10 to 20 carbon atoms and at least one other of said ester groups being a polycarboxylic acid mono-ester group, in an organic solvent miscible with said coating composition.

References Cited
UNITED STATES PATENTS

| | | | |
|---|---|---|---|
| 2,371,866 | 3/1945 | Barrett | 106—186 |
| 2,824,018 | 2/1958 | Cornwell | 106—186 |
| 2,852,406 | 9/1958 | Riegler et al. | 106—308 |
| 2,973,382 | 2/1961 | Dreher | 260—404 |

ALEXANDER H. BRODMERKEL, *Primary Examiner.*

D. J. ARNOLD, *Assistant Examiner.*